US012119721B2

(12) United States Patent
Conner et al.

(10) Patent No.: US 12,119,721 B2
(45) Date of Patent: Oct. 15, 2024

(54) END FIBER FOR STATOR AND METHOD OF FORMING CONDUCTORS

(71) Applicant: BorgWarner Inc., Auburn Hills, MI (US)

(72) Inventors: Matthew R. Conner, Mt. Carmel, IL (US); Joshua B. Lahrman, New Palestine, IN (US)

(73) Assignee: BorgWarner Inc., Auburn Hills, MI (US)

( * ) Notice: Subject to any disclaimer, the term of this patent is extended or adjusted under 35 U.S.C. 154(b) by 124 days.

(21) Appl. No.: 17/552,883

(22) Filed: Dec. 16, 2021

(65) Prior Publication Data

US 2023/0198329 A1    Jun. 22, 2023

(51) Int. Cl.
*H02K 3/50* (2006.01)
*H02K 15/00* (2006.01)

(52) U.S. Cl.
CPC ........... *H02K 3/50* (2013.01); *H02K 15/0062* (2013.01); *H02K 2203/06* (2013.01)

(58) Field of Classification Search
CPC .. H02K 3/04; H02K 3/12; H02K 3/24; H02K 3/345; H02K 3/525; H02K 3/38; H02K 3/30; H02K 3/50; H02K 3/14; H02K 3/28; H02K 3/52; H02K 1/16; H02K 1/165
See application file for complete search history.

(56) References Cited

U.S. PATENT DOCUMENTS

| 5,081,382 | A   | * | 1/1992 | Collings | H02K 3/24 310/260 |
| 6,400,059 | B1  | * | 6/2002 | Hsu      | H02K 11/33 310/71 |
| 10,923,978 | B2 | * | 2/2021 | Shiah    | H02K 1/165 |
| 11,271,447 | B2 | * | 3/2022 | Fukuda   | H02K 3/04 |
| 2018/0254674 | A1 | * | 9/2018 | Hoshina | H02K 3/12 |
| 2022/0224182 | A1 | * | 7/2022 | Neet    | H02K 3/522 |

OTHER PUBLICATIONS

Pending U.S. Appl. No. 17/545,929, filed Dec. 8, 2021. Inventors: Kirk Neet, Tausif Hasain, and Micah Jones.

* cited by examiner

*Primary Examiner* — Leda T Pham
(74) *Attorney, Agent, or Firm* — Maginot, Moore & Beck, LLP

(57) ABSTRACT

A stator for an electric machine comprises a cylindrical stator core, windings positioned on the stator core, and an end disc positioned an end of the stator core. The stator core defines an inner diameter and an outer diameter. A plurality of slots are formed in the core and extend radially from the inner diameter toward the outer diameter. The windings include in-slot portions, end turns, and at least one jumper. The end disc defines a plurality of slots aligned with the slots of the stator core and at least one dog hole removed from the slots of the end disc. The at least one jumper is bent circumferentially around the dog hole and connects two of the in-slot portions of the windings.

20 Claims, 4 Drawing Sheets

END FIBER FOR STATOR AND METHOD OF FORMING CONDUCTORS

FIELD

This application relates to the field of electric machines, and more particularly, conductor formation for winding arrangements.

BACKGROUND

Electric machine stators include windings that are positioned on a stator core. The windings include conductors that extend through the slots of the stator core, end turns that extend between the conductors in the slots, and numerous leads that extend from certain conductors within the slots. These winding often require special connections at the leads in order to complete one or more of the following: (i) connect parallel leads, (ii) create the neutral point for the winding arrangement, (iii) route phase leads to a connection point for an inverter, and (iv) connect leads in order to create series connections for winding paths. All of these connections tend to fight with each other for the same space. Consequently, the bus bars can become quite tall in an axial direction (i.e., as defined by an axis extending through a center of the stator core), extending beyond the winding end turns.

In view of the above, it can be difficult to properly package the stator within the limited space of the vehicle engine compartment. The problem is worsened when even more leads are associated with the winding because of the winding having an increased number of slots per pole per phase, an increased number of parallel wires per phase, or an increased number of phases. The problem is worsened when numerous jumpers and/or series connections between winding paths are required.

In view of the foregoing, it would be desirable to provide for jumpers and other connections that may be easily configured and arranged on the stator. It would also be advantageous if the connections resulted in a reduced length and/or outer diameter of the stator. It would be of further advantage if such connections could be provided with a reduced number of welds or other connections between winding leads. It would also be advantageous if such stator could be easily manufactured, thus reducing manufacturing time and costs. While it would be desirable to provide a stator and winding that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY

In accordance with at least one embodiment of the disclosure, a stator for an electric machine comprises a cylindrical stator core, windings positioned on the stator core, and an end disc positioned at an end of the stator core. The stator core defines an inner diameter and an outer diameter. A plurality of slots are formed in the core and extend radially from the inner diameter toward the outer diameter. The windings include in-slot portions, end turns, and at least one jumper. The end disc defines a plurality of slots aligned with the slots of the stator core and at least one dog hole removed from the slots of the end disc. The at least one jumper is bent circumferentially around the dog hole and connects two of the in-slot portions of the windings.

In accordance with another embodiment of the disclosure, an end disc for a stator includes a disc-shaped body defining an inner diameter and an outer diameter, and a plurality of slots evenly distributed around the body. Each slot of the end disc extends radially outward from the inner diameter toward the outer diameter of the body. At least one tool retaining structure is positioned radially outward from the slots.

In accordance with yet another embodiment of the disclosure, a method is provided for connecting a jumper in a winding of an electric machine. The method comprises placing an end disc on an end of a stator core, and then arranging conductors on the stator core to form windings, the windings including in-slot portions, end turns and a plurality of terminal portions. The method further comprises engaging a dog with a dog retaining structure formed in the end disc, and engaging a first terminal portion extending from a first slot of the stator core with the dog. Thereafter, the method comprises bending said first terminal portion around the dog and then connecting the first terminal portion to a second terminal portion extending from a second slot of the stator core.

The above described features and advantages, as well as others, will become more readily apparent to those of ordinary skill in the art by reference to the following detailed description and accompanying drawings.

DESCRIPTION

Figure 1:
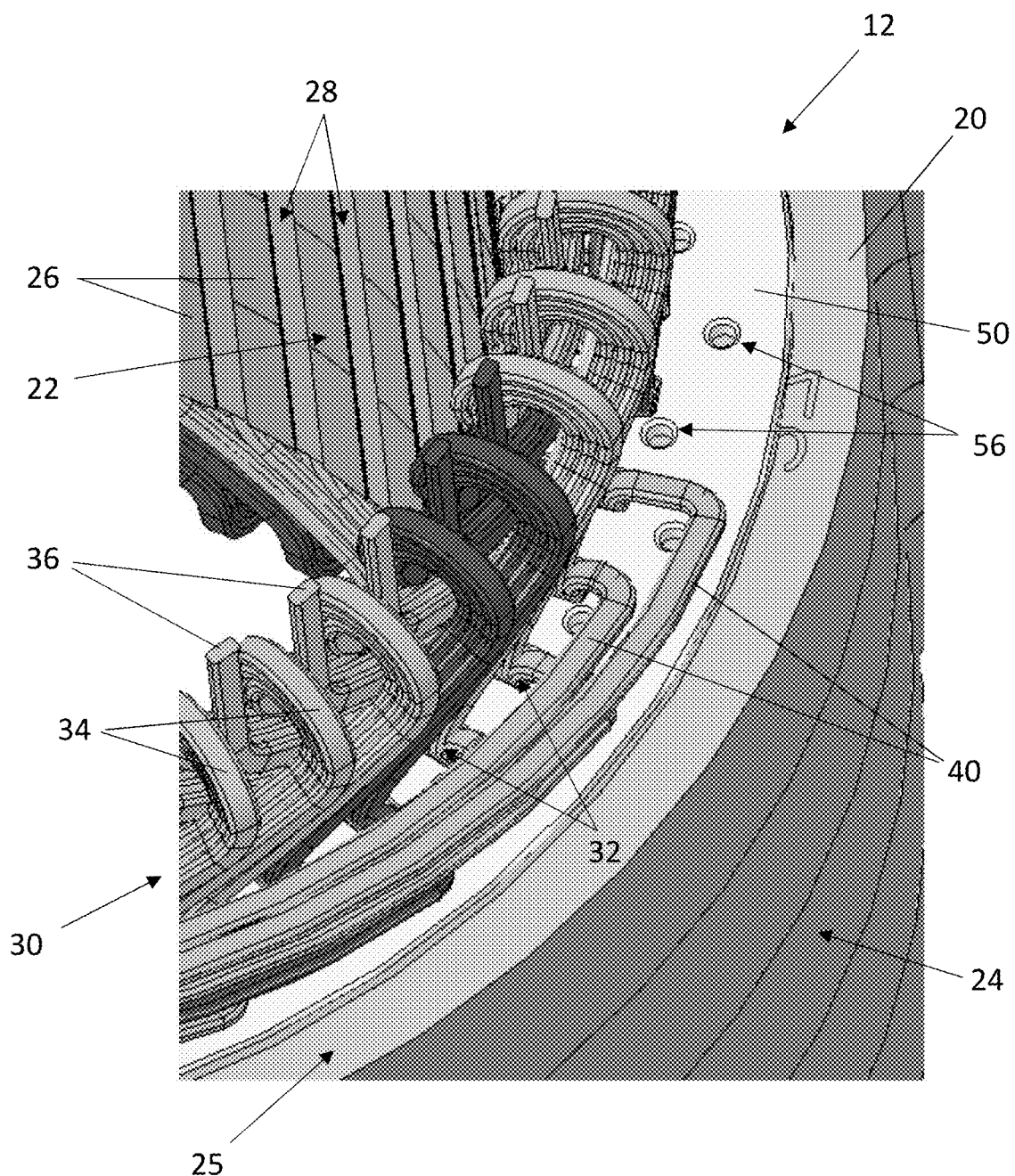
FIG. 1 is a perspective view of a portion of a stator including a stator core, end disc, and winding arrangement, the winding arrangement including circumferential conductors extending along an outer diameter of the winding arrangement.

As disclosed herein, a stator 12 for an electric machine includes a stator core 20 with a winding arrangement 30 positioned on the core 20. The stator 12 further includes an end disc 50 positioned on an end of the core 20 with a plurality of slots 54 and holes 56 formed in the end disc 50. Conductors of the winding arrangement 30 extend through the slots. Jumpers 40 of the winding arrangement 30 are bent around the holes 56 of the end disc 50.

Stator Core and Windings

As illustrated in FIG. 1, the stator core 20 is comprised of a ferromagnetic material and is typically formed from a plurality of steel sheets that are stamped and stacked upon one another to form a lamination stack. The stator core 20 is generally cylindrical in shape as defined by a center axis (not shown). The stator core 20 includes a cylindrical inner perimeter surface 22 and a cylindrical outer perimeter surface 24, each extending between opposing ends of the stator core 20. The inner perimeter surface 22 defines an inner diameter (ID) for the stator assembly 12 (which may also be referred to herein as an inner cylindrical surface). The outer perimeter surface 24 defines an outer diameter (OD) for the stator assembly 12 (which may also be referred to herein as an outer cylindrical surface). A plurality of teeth 26 are formed on the stator core 20 and directed inwardly toward the center axis. Each tooth 26 extends in a radial direction from an outer midsection of the core 20 and terminates at the inner perimeter surface 22. Accordingly, the teeth 26 extend to the inner perimeter surface 22, but are not found at the outer perimeter surface 24 of the core 20.

Axial slots 28 are formed in the stator core 20 between the teeth 26. Each axial slot extends from one end surface 25 to an opposite end surface (not shown) of the stator core 20. The slots 28 defined between the teeth 26 may be open along the inner perimeter surface 22 of the stator core 20, or may be semi-closed slots with each slot 28 having a smaller width near the inner perimeter surface 22 than the width closer to the outer perimeter surface 24. Openings to the slots 28 are thus provided through the inner perimeter surface 22 as well as through both ends of the stator core 20. Each slot 28 is defined between adjacent teeth 26, with two adjacent teeth forming two opposing radial walls for one slot. Like the teeth 26, the slots 28 do not extend to the outer perimeter surface 24 of the stator core 20. Thus, the outer perimeter surface 24 of the core 20 is generally continuous and free of teeth 26 and slots 28.

The stator core 20 is configured to retain the winding arrangement 30 (which may also be referred to herein as "windings"). The winding arrangement 30 includes a plurality of conductors that extend through the slots 28 of the stator core 20. In at least one embodiment, the winding arrangement 30 is formed from a plurality of elongated wires (e.g., copper wires) that are continuously wound within the slots 28 on the stator core 20 in order to form the windings. In at least one alternative embodiment, the winding arrangement 30 is formed from a plurality of segmented conductors (e.g., copper conductor segments, which are sometimes referred to as "hairpin" or "U-turn" conductors), as will be recognized by those of skill in the art. The segmented conductors are inserted into the slots 28 from a first end (e.g., an "insertion end") of the stator core 20. The segmented conductors are connected together at an opposite end (e.g., a "weld end") of the stator core 20.

The conductors of the winding arrangement 30 are connected together form a plurality of phase windings. In at least one embodiment, the completed winding arrangement includes three phase windings (e.g., phase U windings, phase V windings, and phase W windings) with multiple paths for each phase. The conductors may be connected in different ways to provide for different winding arrangement with different features. One example of a stator winding arrangement is disclosed in U.S. patent application Ser. No. 17/545,929, filed Dec. 8, 2021, the contents of which are incorporated herein by reference in their entirety. It will also be recognized by those of skill in the art that numerous other winding arrangements are possible and contemplated herein.

The conductors that form the completed windings 30 on the stator core include in-slot portions 32, end turns 34, and terminal portions 36. The in-slot portions 32 are straight portions of the conductors that extend through the slots 28 of the stator core 20. Each in-slot portion 32 carries current from one end of the stator core (e.g., end 25) to the opposite end of the stator core. As will be recognized by those of skill in the art, the in-slot portions 32 may be aligned in a single file line in each slot from, and each position in the line may be referred to a conductor "layer". For example, each slot 28 may include four layers, six layers, eight layers, or some other number of layers of conductors arranged in a single file line from an innermost layer to an outermost layer.

With continued reference to FIG. 1, the end turns 34 connect the in-slot portions 32 of the windings at opposing ends of the stator core 20. In particular, each end turn 34 connects one in-slot portion in a first slot to another in-slot portion in a second slot. The number of slots spanned by the end turn defines a "pitch" of the end turn (e.g., five, six, seven pitch, etc.). When the windings are formed from segmented conductors, the end turns 34 include bent portions (also referred to as "U-turns") arranged on an insertion end of the core, and welded portions on a connection end (also referred to as a "weld end") of the stator core. In this case, each segmented conductor includes a first leg that extends through one slot, a second leg that extends through another slot, and U-turn that extends between the two legs. The U-turns provide end turns 34 on the insertion end of the core 20. The leg ends that extend from the connection end of the stator are bent to form adjacent leg ends. Adjacent leg ends are welded or otherwise connected together in order to form end turns 34 on the connection end of the stator core. In any event, the end turns 34 collectively define a crown on each end of the stator core (e.g., at the end associated with end surface 25). Each crown extends circumferentially around the stator core 20 and extends an axial distance past the end of the core as defined by a standard end turn height.

The terminal portions 36 of the winding (which may also be referred to herein as "leads") are conductor portions that extend out of a slot 28 and subsequently terminate without connection to another conductor of the winding. In other words, the terminal portions 36 are conductors that extend out of a slot but do not include a U-turn bend such that they are redirected into another slot. For windings comprised of continuously wound conductors, terminal portions 36 are provided as phase leads, neutral leads, and conductor portions to be connected with jumpers. On the other hand, for windings comprised of segmented conductors, all of the conductors on the weld end of the core may also be considered terminal portions 36 prior to welding of adjacent leg ends. After welding adjacent leg ends, the terminal portions 36 of adjacent welded conductors form end turns for the winding, and are no longer considered terminal portions. When the terminal portions 36 form phase leads or neutral leads, the terminal portions often extend in the axial direction past the tips of the end turns 34. At least some of the terminal portions are used as jumpers 40 that bend circumferentially without extending axially past the end turns 34, as described in further detail below.

As shown in FIG. 1, at least some terminal portions 36 are bent around the dog holes 56 and provide low-profile jumpers 40 for the winding 30. These jumpers 40 follow a circular arc or other contour of the associated dog hole 56. Each jumper 40 connects two terminal portions 36 of the winding. The bent terminal portion 36 that provides the jumper 40 is of sufficient length to extend to a remote lead without the need for an additional connecting conductor. By bending the terminal portion 36 around a dog hole 56, a low-profile jumper 40 is provided with only one weld required to connect the two terminal portions (as opposed to a conventional jumper with a weld at each of the two terminal portions connected by the jumper). As can be seen in FIG. 1, each jumper 40 is positioned radially outward from the end turns 34 of the winding and axially within the crown defined by the end turns.

As will be recognized from the foregoing description, the windings 30 and the stator core 20 define various stator dimensions. For example, the cylindrical shape of the stator core 20 may be defined by the OD and the ID. Additionally, length of the stator core 20 in the axial direction is defined by the distance between the axial-facing surface on the connection end and the opposing axial-facing surface on the weld end. With respect to the windings 30, because the winding end turns 34 extend past the stator core 20 in the axial direction, the axial length of the windings 30 is greater in the axial length of the stator core 20. The axial length of the windings 30 may be defined by the distance between the tips of the end turns 34 at opposite ends of the stator core 20. The "tip" of an end turn 34 may be considered to be the outermost point/region on the end loop in the axial direction from the stator core 20. If the tips of the end turns 34 on each side of the stator are considered to lie in a single plane, the axial length of the windings 30 may be defined as the distance between these two planes. Similarly, a crown height is defined on each end of the stator by the distance between the end surface of the core (e.g., end surface 25) and the tips of the end turns 34 on such end. The end turns 34 that form the crown on each end of the stator are arranged in a circular manner. The outer conductors of the end turns 34 may be considered to define an outer diameter for the crown, and the inner conductors of the end turns 34 may be considered to define an inner diameter for the crown. As noted previously, the jumpers 40 are arranged radially outside of the outer diameter of the crown and axially within the crown height.

End Disc

An end disc 50 is positioned on the end surface 25 of the stator core 20. In at least one embodiment the end disc 50 is adjacent to and directly abuts the end surface 25 of the stator core 20. The end disc 50 is comprised of an insulative material, such as a fiberglass, a polymer, or other material that does not readily conduct electricity (i.e., as compared to a conductive material such as copper). When the end disc 50 is comprised of a fiberglass, or other non-conductive material, the end disc 50 may be specifically referred to as an "end fiber." In various embodiments, the end fiber may be provided in any of numerous shapes and sizes, and is not limited to a disc shape. In still other embodiments, the end disc may be comprised of a material other than a non-conductive material, such as a metal or ferromagnetic material.

Figure 2:
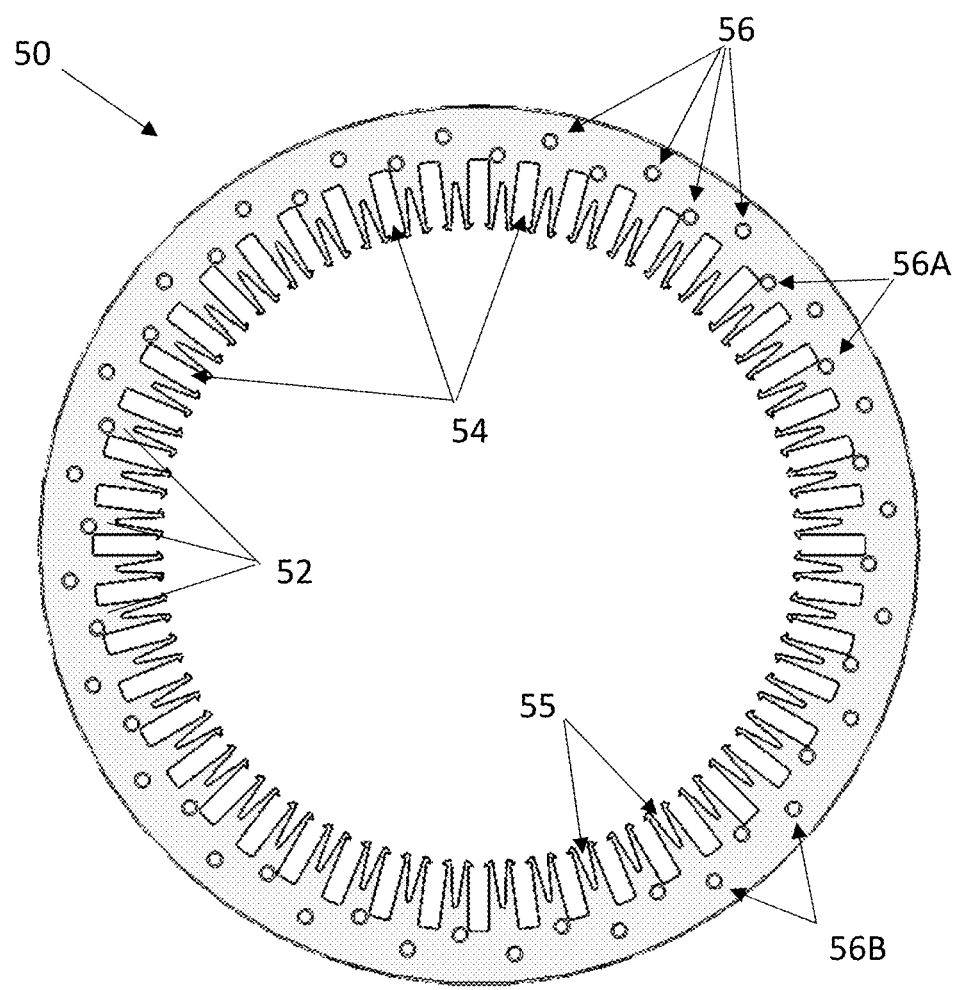
FIG. 2 is a plan view of the end fiber of FIG. 1.

As best shown in FIG. 2, the end disc 50 includes a plurality of teeth 52, slots 54 defined between the teeth, and a plurality of holes 56. The plurality of teeth 52 of the end disc 50 are similarly sized and are aligned with the teeth 26 of the stator core 20 when the end disc 50 is positioned on the stator core (as shown in FIG. 1).

The plurality of slots 54 of the end disc 50 are formed between the teeth 52. The plurality of slots 54 are similarly sized and aligned with the slots 28 of the stator core when the end disc is positioned on the stator core. Accordingly, in the completed stator, the conductors of the winding 30 extend through the slots 54 of the end disc 50 as well as the slots 28 of the core 20. As shown in FIG. 2, a plurality of V-shaped grooves 55 are also formed between the slots 54. The V-shaped grooves 55 expose additional surface area of the end surface 25 of the stator core 20 and facilitate cooling of the core 20.

The plurality of holes 56 of the end disc 50 are removed from the slots 54 and are arranged radially outward from the slots 54. The holes 56 are each configured to receive a post of a dog 60 (see FIG. 4) or other forming tool. Because of this, the holes 56 may also be referred to herein as "dog holes." While the dog holes 56 in the disclosed embodiment are circular in shape (and define a circumference or other circular arc), it will be recognized that the dog holes 56 may alternatively be different shapes, such as semi-circles, squares, octagons, or any of various other shapes. Furthermore, the inclusion of dog holes 56 are but one possible embodiment for the end disc 50, as any number of different types of dog/tool retaining structures may be used on the end disc in lieu of dog holes. For example, the dog retaining structures may take the form of protuberances or other structures formed on the surface of the end disc 50 and specifically configured to retain a dog in place during a bending process or other conductor formation process (e.g., a process similar to that described below in association with FIGS. 3 and 4).

In the disclosed embodiment, a single dog hole 56 is associated with each of the plurality of slots 54. The dog holes 56 include a first group of dog holes 56A positioned radially inward from a second group of dog holes 56B. To this end, the first group of dog holes 56A are positioned around a first circumference defined on the end disc 50, and the second group of dog holes 56B are positioned around a second circumference defined on the end disc 50, wherein the second circumference is greater than the first circumference.

The dog holes 56 may be either through-holes (i.e., holes that extend completely through the end disc 50) or blind holes (i.e., holes that result in a depression in the surface of the end disc 50, but do not completely through the end disc 50). When the dog holes are blind holes, they extend only partially through the end disc 50, such as 25% to 75% penetration thorough the end disc. For example, if the end disc 50 has a thickness of 4 mm, the dog holes 56 may penetrate 1 mm to 3 mm into the surface of the end disc.

Method of Forming Winding Conductors

Figure 3:
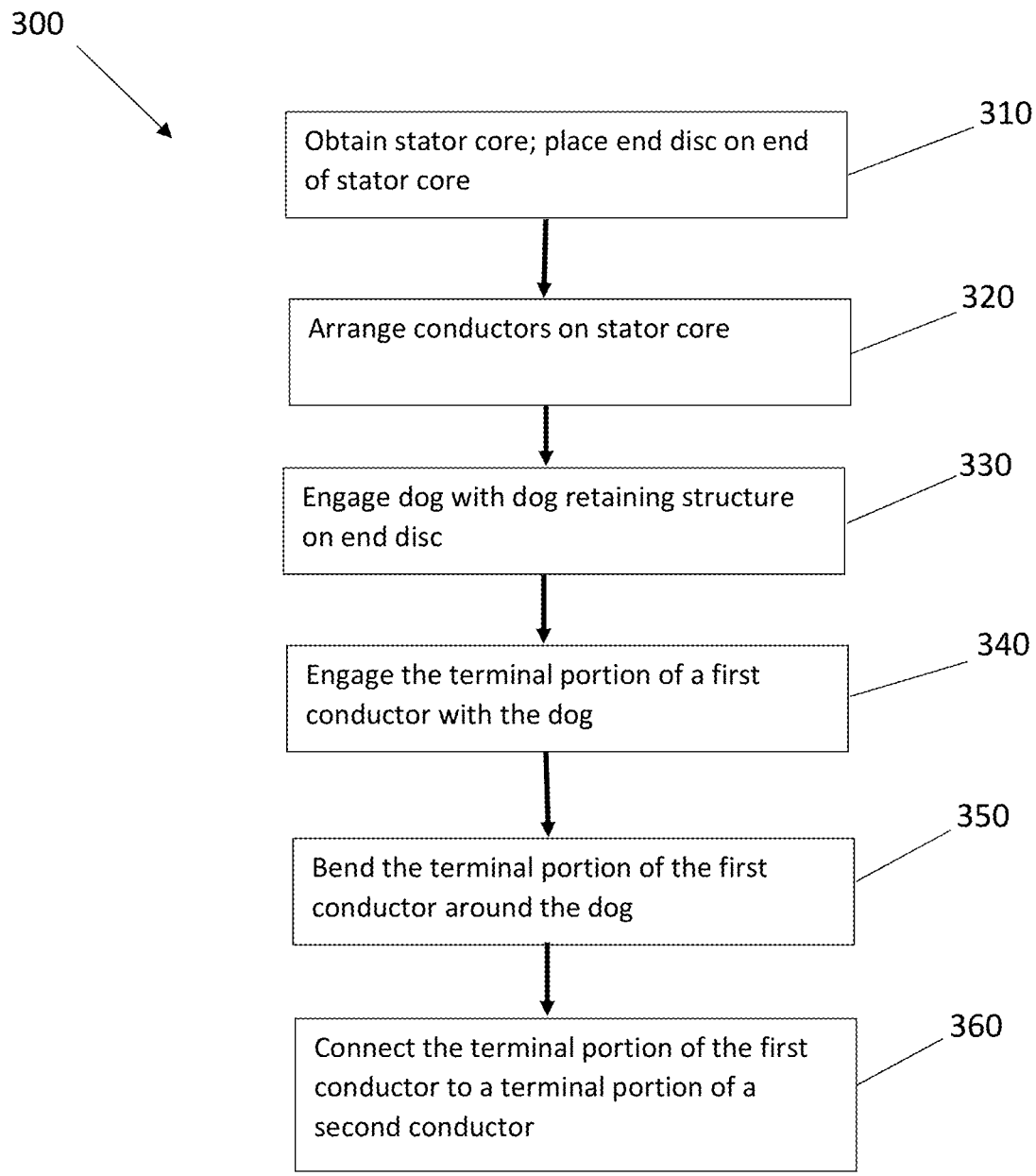
FIG. 3 is a block diagram of a method of forming a conductors for a winding arrangement.
Figure 4:
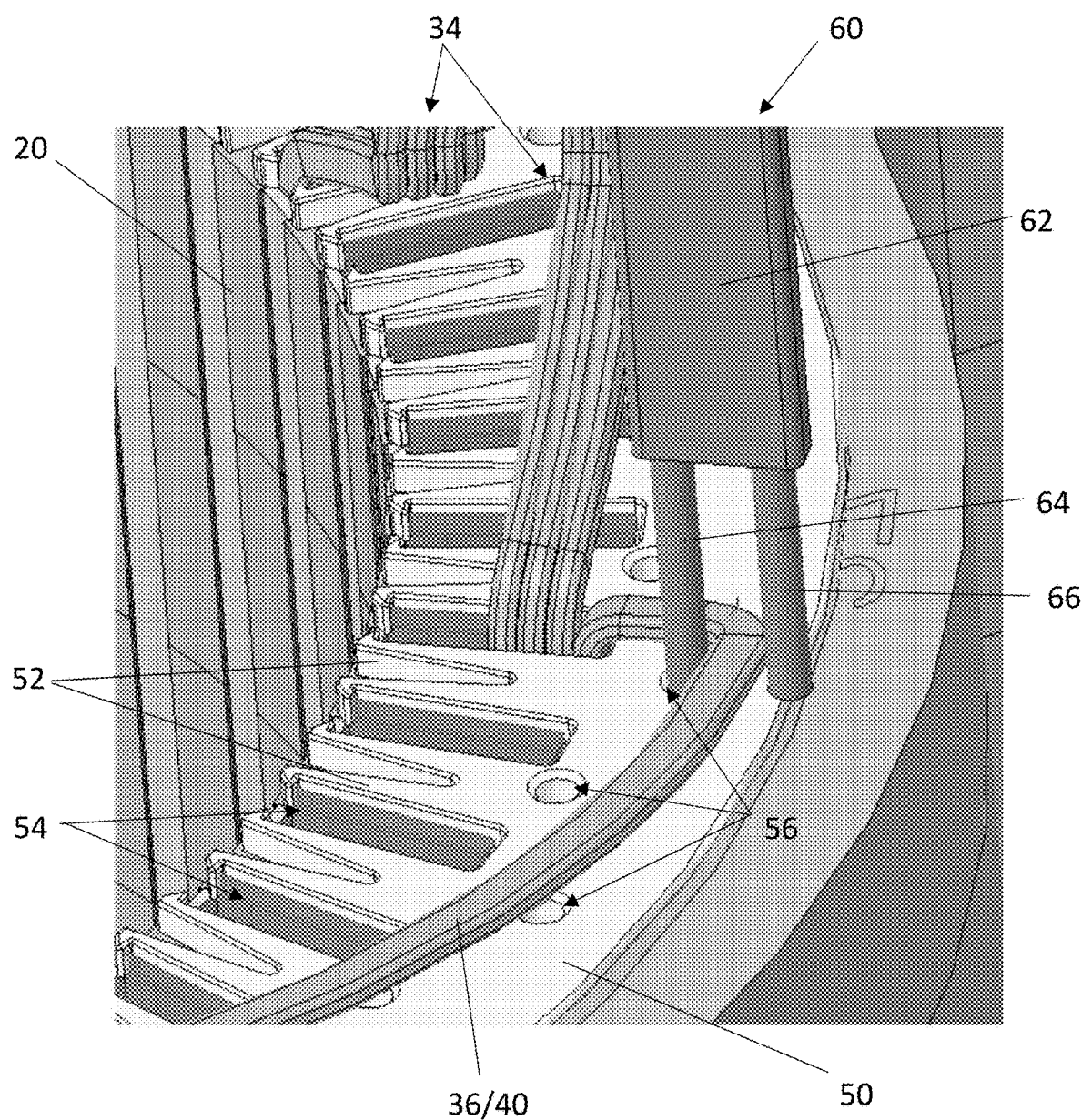
FIG. 4 is a perspective view of a forming tool in engagement with the end disc during formation of the circumferential conductors of FIG. 1 in accordance with the method of FIG. 3.

With reference now to FIGS. 3 and 4 a method 300 of forming winding conductors is described. As noted in FIG. 3, the method 300 begins at block 310 wherein a stator core 20 is obtained and an end disc 50 is positioned on an end surface 25 of the stator core.

Thereafter, the method continues with step 320, and conductors are arranged on the stator core to form windings 30. As described above, the windings include in-slot portions 32, end turns 34 and a plurality of terminal portions 36.

After the conductors are positioned in the slots 28 of the stator core, a terminal portions 36 extend from at least two of the slots. The method then continues with block 330, and a dog 60 is engaged with one of the dog holes 56 (or other dog retaining structures) of the end disc 50. In particular the dog 60 is engaged with the dog hole 56 that is nearest the terminal portion that will be used to form a jumper 40. One example of engagement of the dog 60 with a dog hole 56 is illustrated in FIG. 4.

The term "dog" is used herein to refer to a mechanical device that is to engage a conductor to be bent during formation of the windings. It will be recognized that the dog 60 may take any number of different forms. As shown in FIG. 4, in at least one embodiment, the dog 60 includes a body 62, a first post 64 and a second post 66. The body 62 is generally a solid member that is rectangular in shape and is designed and dimensioned to be grasped by a human hand. The first post 64 extends a first distance from a lower portion of the body 62. The first post 64 is defined by a cross-sectional shape and diameter such that the post 64 may be inserted into one of the dog holes 56. The second post 66 extends from the same side of the body 62 as the first post 64. The second post 66 is similar in size and shape to the first post 64. However, in at least one embodiment the second post is slightly longer or shorter than the first post. The dog 60 may be comprised of any of a number of different materials that provide sufficient strength to allow the conductors to be bent around one of the posts 64, 66. For example, the dog 60 may be comprised of a polymer material, fiberglass, or metal.

With reference again to FIG. 3, at block 330 the post 64 of the dog 60 is engaged with the dog retaining structure by inserting the first post 64 of the dog 60 into one of the dog holes 56 (i.e., the dog hole nearest the slot that the terminal portion extends from). In at least one embodiment, this is accomplished by a human grasping the body 62 of the dog, inserting the first post 64 into the dog hole 56, and stabilizing the dog by engaging the second post 66 with the surface of the end disc 50 or the stator core 20.

After the dog 60 is engaged with the dog retaining structure at block 330, the method continues to block 340, and the terminal portion 36 that will form the jumper 40 is threaded through the two posts 64, 66 of the dog 60. (Or alternatively, the terminal portion/jumper 36/40 is threaded through the two posts 64, 66 prior to the dog 60 being engaged with the end disc 50.) The terminal portion/jumper 36/40 is then brought into engagement with the first post 64 of the dog 60. Thereafter, at block 350 the terminal portion/jumper is bent around the first post 64 of the dog 60. As a result, the terminal portion/jumper 36/40 has a bend contour that follows that of the first post. The extent of the bend is typically about 90 degrees, but may also be more or less than 90, depending on the intended configuration of the jumper 40 in the final winding arrangement. FIG. 4 shows an example of a jumper 40 after it is bent around the post 64 of the dog 60, as called for in block 350 of FIG. 3

After the terminal portion/jumper 36/40 is bent around the dog 60, the method continues at block 360, and the end of the first terminal portion/jumper 36/40 (i.e., the terminal portion that forms the jumper 40) is connected to the end of a second terminal portion (not shown in FIG. 4). This connection may be accomplished by a weld or other connection means, as will be recognized by those of skill in the art.

Advantageously, as shown in FIG. 1, the above-described method results in a jumper 40 for the winding 30 that is positioned radially outward of the crown and axially within the crown height. Moreover, instead of requiring two separate welds to connect a jumper between two terminal portions, only a single weld is required to connect the two terminal portions. This is possible because the extended length of a first of the two terminal portions 36 is sufficient to be bent in the manner described above and provide a jumper 40. The end of this first terminal portion is then connected to the end of the second terminal portion with a single weld (or other connection). The winding arrangement and method disclosed herein thus offers a stator having jumper connections with a reduced profile wherein each jumper only requires a single weld (or other connection). As a result, the winding arrangement and method provides for a compact size stator with reduced opportunities for broken connections between winding conductors.

The foregoing detailed description of one or more embodiments of the stator with outer diameter bus bar connection has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

Various embodiments are presented in the drawings and in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

What is claimed is:

1. A stator for an electric machine, the stator comprising:
   a cylindrical stator core defining an inner diameter and an outer diameter, a plurality of slots formed in the core and extending radially from the inner diameter toward the outer diameter;
   windings positioned on the stator core, the windings including in-slot portions, end turns, and at least one jumper; and
   an end disc positioned at an end of the stator core, the end disc defining a plurality of slots aligned with the slots of the stator core and at least one dog hole removed from the slots of the end disc, wherein the at least one jumper is bent circumferentially around the dog hole and connects two of the in-slot portions of the windings.

2. The stator of claim 1 wherein the at least one dog hole is positioned radially outward of the slots of the end disc.

3. The stator of claim 1 wherein the at least one dog hole defines a circular arc.

4. The stator of claim 3 wherein the at least one jumper includes a bend that follows a contour of the circular arc.

5. The stator of claim 1 wherein the at least one dog hole is a through hole in the end disc.

6. The stator of claim 1 wherein the at least one dog hole includes a first plurality of dog holes arranged along a first circumference of the end disc and a second plurality of dog holes arranged along a second circumference of the end disc, the second circumference being different than the first circumference.

7. The stator of claim 1 wherein the end turns define a crown having a crown height, a crown inner diameter, and a crown outer diameter, and wherein the at least one jumper is positioned radially outward from the crown outer diameter and axially within the crown height.

8. The stator of claim 1 wherein the end disc is an end fiber primarily comprised of an insulative material.

9. An end disc for a stator, the end disc comprising:
   a disc-shaped body defining an inner diameter and an outer diameter;
   a plurality of slots evenly distributed around the body, each slot extending radially outward from the inner diameter toward the outer diameter of the body; and at least one forming tool retaining structure positioned radially outward from the slots.

10. The end disc of claim 9 wherein the at least one forming tool retaining structure includes at least one exposed hole configured to receive a pin of a dog.

11. The end disc of claim 10 wherein the at least one hole includes a through-hole in the body.

12. The end disc of claim 10 wherein the at least one hole is positioned radially outward of the plurality of slots.

13. The end disc of claim 10 wherein the at least one hole defines a circular arc.

14. The end disc of claim 10 wherein the at least one hole includes a blind hole in the end disc.

15. The end disc of claim 10 wherein the at least one hole includes a first plurality of dog holes arranged along a first circumference of the end disc and a second plurality of dog holes arranged along a second circumference of the end disc, the second circumference being different than the first circumference.

16. The end disc of claim 9 wherein the end disc is an end fiber primarily comprised of an insulative material and configured to engage an end of a stator core.

17. A method of connecting a jumper in a winding of an electric machine, the method comprising:
placing an end disc on an end of a stator core;
arranging conductors on the stator core to form windings, the windings including in-slot portions, end turns and a plurality of terminal portions;
engaging a dog with a dog retaining structure formed in the end disc;
engaging a first terminal portion extending from a first slot of the stator core with the dog;
bending said first terminal portion around the dog; and
connecting the first terminal portion to a second terminal portion extending from a second slot of the stator core.

18. The method of claim 17 wherein the dog retaining structure is a hole in the end disc, and wherein engaging the dog with dog retaining structure includes inserting a post of the dog into the hole in the end disc, wherein the end turns define a crown having a crown height, a crown inner diameter, and a crown outer diameter, wherein the first terminal portion is arranged radially outward of the crown outer diameter and axially within the crown height.

19. The method of claim 18 wherein the post is a first post, wherein the dog further includes a second post, the method further comprising inserting the first terminal portion between the first post and the second post prior to engaging the first terminal portion with the dog.

20. The method of claim 19 wherein the first post is longer than the second post, and wherein the second post engages an outer surface of the end disc when the first post is inserted into the hole of the end disc.

* * * * *